United States Patent [19]

Cook et al.

[11] Patent Number: 4,866,591
[45] Date of Patent: Sep. 12, 1989

[54] REGULATED TRANSFORMER RECTIFIER UNIT

[75] Inventors: Alexander Cook; Robert Barnet, both of Rockford, Ill.

[73] Assignee: Sundstrand Corporation, Rockford, Ill.

[21] Appl. No.: 236,794

[22] Filed: Aug. 26, 1988

[51] Int. Cl.$^4$ .............................................. H02M 7/06
[52] U.S. Cl. ........................................ 363/67; 363/70; 363/126; 307/86
[58] Field of Search ............... 363/65, 67, 69, 70, 363/125, 126; 307/52, 53, 55, 58, 75, 80, 82, 85-87

[56] References Cited

U.S. PATENT DOCUMENTS

| | | |
|---|---|---|
| 1,893,760 | 1/1933 | Boyajian . |
| 1,961,153 | 6/1934 | Lazarus . |
| 3,112,439 | 11/1963 | Rosin . |
| 3,275,929 | 9/1966 | Schatz . |
| 3,921,059 | 11/1975 | Birman et al. . |
| 4,072,889 | 2/1978 | Witmer et al. . |
| 4,208,709 | 6/1980 | Garnham et al. . |
| 4,242,630 | 12/1980 | Szpakowski et al. . |
| 4,330,818 | 5/1982 | Peschel . |
| 4,339,704 | 7/1982 | McSparran et al. . |
| 4,555,753 | 11/1985 | Takahashi . |
| 4,622,629 | 11/1986 | Glennon ................................. 363/70 |
| 4,631,654 | 12/1986 | Houee et al. ........................... 363/67 |
| 4,729,082 | 3/1988 | Sato . |
| 4,739,466 | 4/1988 | Glennon et al. ....................... 363/70 |

Primary Examiner—Peter S. Wong
Attorney, Agent, or Firm—Wood, Dalton, Phillips, Mason & Rowe

[57] ABSTRACT

A transformer rectifier unit is provided for developing regulated DC output power from first and second sources of unregulated DC power. The transformer rectifier unit includes a transformer having a primary winding connectable to a source of AC input power and first and second secondary windings. The first secondary winding develops AC power at a first level and the second secondary winding develops AC power at a second level lower than the first level. First and second rectifier circuits are respectively coupled to the first and second secondary circuits for rectifying the AC power therefrom to DC power having corresponding first and second DC levels. A switch is coupled between an output of the first rectifier circuit and an output of the second rectifier circuit and is operable in first and second switching states to provide DC output power from one of the rectifier circuits to a load. A pulse-width modulation control circuit is responsive to the difference between a desired DC output level and an actual DC output level and operates the switch between first and second states to provide regulated DC output power. In an alternative embodiment of the invention, the transformer comprises Y-Δ secondary winding sets.

18 Claims, 2 Drawing Sheets

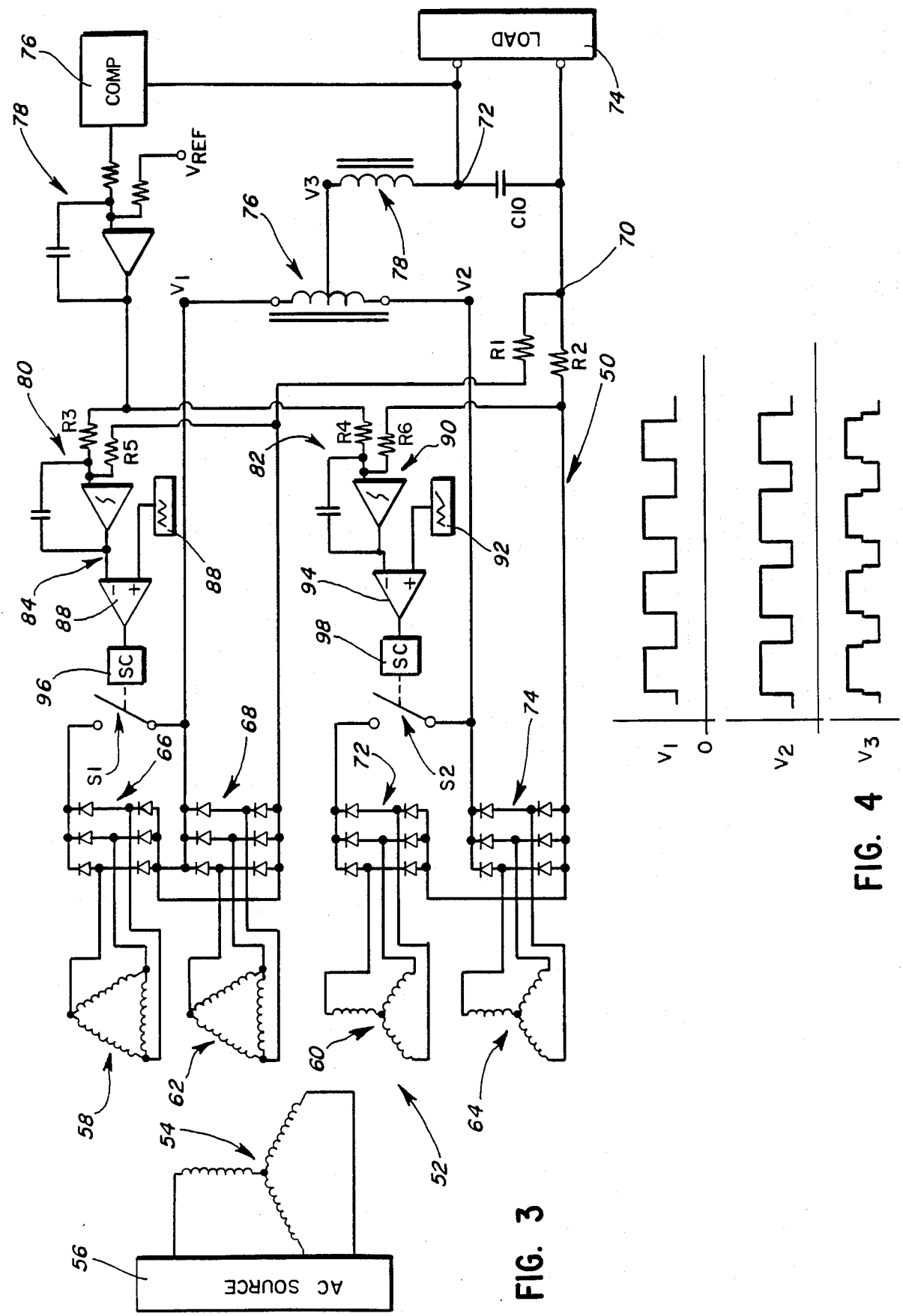

REGULATED TRANSFORMER RECTIFIER UNIT

DESCRIPTION

1. Technical Field

The present invention relates generally to regulated power systems, and more particularly, to a regulated transformer rectifier unit.

2. Background of the Invention

It is often desirable, or necessary, to provide regulated power from a source of unregulated power If the source provides AC power, and DC power is required, then it is necessary to also convert to DC power while maintaining proper regulation and high efficiency.

One approach for obtaining regulated output power from an unregulated source is described in Boyajian U.S. Pat. No. 1,893,760. This patent describes a voltage regulating system including an autotransformer coupled to an AC source and having high and low relative voltage taps which are coupled through switching devices and inductors to a load A voltage responsive bridge is coupled across the load and operates the switches to alternately couple the high voltage tap and the low voltage tap to the load for relative durations depending upon the voltage across the load to provide an average, or regulated, voltage intermediate the high and low voltages.

The transient response of the Boyajian system may be objectionable since the high and low voltage taps are alternately coupled to the load at a frequency dependent upon the frequency of the AC input power. To improve the response, large, heavy filters are required. Such additional size and weight may be undesirable in many applications, such as in an aircraft power system. Also, such a system provides only regulated AC power, rather than regulated DC power.

The present invention is directed to overcoming these and other problems associated with prior regulated power systems.

SUMMARY OF THE INVENTION

In accordance with the present invention, a transformer rectifier unit is provided which alternately couples first and second sources of DC power to an output circuit to provide regulated DC output power.

Broadly, there is disclosed herein a transformer rectifier unit for developing regulated DC output power at an output circuit and including first and second interface means for connecting to respective first and second sources of unregulated DC power, wherein the sources have different DC output levels. Switching means are coupled between the first and second interface means and the output circuit and are operable to selectively couple either the first or second source of DC power to the output circuit A modulating means defines a preselected cycle time for operating the switching means to alternately couple the first and second sources of DC power to the output circuit in each cycle for relative time periods determined responsive to a sensed parameter of the DC output power.

Specifically, according to one embodiment of the invention, the transformer rectifier unit includes a transformer having a primary winding that is connected to a source of AC input power and first and second secondary windings. The first secondary winding develops AC power at a first level and the second secondary winding develops AC power at a second level lower than the first level. First and second rectifier circuits are respectively coupled to the first and second secondary windings for rectifying the AC power therefrom to DC power having corresponding first and second DC voltage levels. A switch is coupled between an output of the first rectifier circuit and an output of the second rectifier circuit and is operable in first and second switching states to provide DC output power from one of the rectifier circuits to a load. A sensing circuit is provided for sensing the level of the DC power provided to the load. A switch drive circuit compares the sensed output level to a desired output level and uses pulse-width modulation to operate the switch between its first and second states to provide regulated DC output power.

It is a feature of the present invention that the switch driving circuit operates at a frequency independent of the frequency of the AC input power.

It is another feature of the present invention that the switch driving circuit operates at a frequency substantially higher than the AC input power frequency to provide an improved transient response.

It is an additional feature of the invention that the switching device is coupled between first and second rectifier circuits so that the voltage across the switching device corresponds to the voltage difference between first and second secondary windings, permitting the use of a lower voltage rated device.

It is still another feature of the invention that output current only flows through one of the voltage rectifier circuits, thereby improving efficiency, particularly at low output voltages.

It is yet another feature of the invention that input EMI is reduced since input conduction is virtually continuous. Specifically, the input current is AC modulated by the difference in transformer ratio between the high and low outputs.

According to an another embodiment of the invention, the transformer rectifier unit is provided with Δ-Y winding sets for the secondaries. Such a transformer rectifier unit is operable to remove low frequency harmonics provided from the input power to reduce distortion.

Further features and advantages of the invention will readily be apparent from the specification and from the drawings.

BRIEF DESCRIPTION OF THE DRAWINGS

FIG. 3 is an electrical schematic illustrating a TRU according to another embodiment of the invention; and FIG. 4 is a series of waveforms illustrating the operation of the TRU of FIG. 3.

DESCRIPTION OF THE INVENTION

Figure 1:
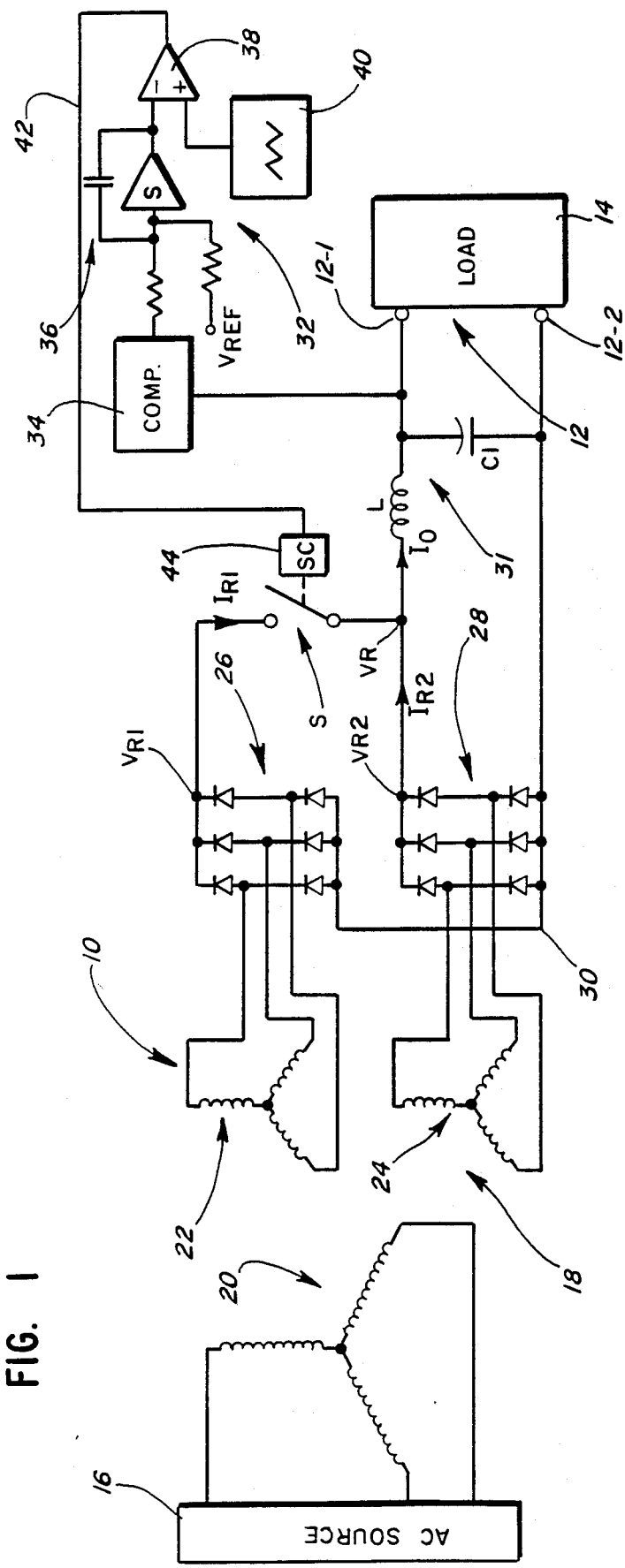
FIG. 1 is an electrical schematic illustrating a transformer rectifier unit according to one embodiment of the present invention.

Referring to FIG. 1, one embodiment of a transformer rectifier unit (TRU) 10 according to the invention is illustrated. The TRU 10 is operable to develop regulated DC power at an output 12, defined by terminals 12-1 and 12-2, which may be coupled to a load 14, from unregulated AC power provided by an AC source 16. The AC source provides three-phase AC power at a preselected frequency.

The TRU 10 includes a transformer 18 having a primary winding 20, wound in a Y configuration, which is coupled to the AC source 16. The transformer 18 includes first and second secondary windings 22 and 24, respectively, also in a Y configuration. The turns ratios of the secondary windings 22 and 24 relative to the primary winding 20 are selected so that AC output power developed by the first secondary winding 22 is of a value to provide a DC voltage at the output 12 greater than is required, and so that the AC power developed in the second secondary winding 24 is of a value to provide DC voltage at the output 12 less than or equal to that required.

The first and second secondary windings 22 and 24 are respectively coupled to first and second three-phase full wave bridge rectifier circuits 26 and 28. The rectifier circuits 26 and 28 are operable to convert the AC power developed by the respective windings 22 and 24 to DC power which defines a voltage between a reference potential at a node 30 and respective first and second rectifier output nodes $V_{R1}$ and $V_{R2}$. Owing to the relationship in the turns ratios of the transformer windings, as discussed above, the DC voltage level at the first node $V_{R1}$ is higher than the DC voltage level at the second node $V_{R2}$. The first rectifier output node $V_{R1}$ is connected through a switch S to the second rectifier circuit output node $V_{R2}$ at a connection node $V_R$. A low-pass filter 31, comprising an inductor L and a capacitor $C_1$, connects the second rectifier node $V_{R2}$ and the reference node 30 to the output terminals 12-1 and 12-2. The filter 31 is operable to filter the AC component superimposed on the DC voltage caused by the switching frequency of the switch S. Resultantly, the DC output voltage produced at the output 12 represents the filtered output from either the first rectifier circuit 26 or from the second rectifier circuit 28, according to the state of the switch S. Specifically, the switch S has an open state and a closed state. If the switch S is in the open state, illustrated in FIG. 1, then the DC power at the output 12 is at a low relative voltage level according to the turns ratio of the second secondary winding 24, as discussed above. Conversely, if the switch S is in the closed state, then the DC power at the output 12 is at a higher relative voltage level owing to the turns ratio of the first secondary winding 26, as discussed above.

The switch S is connected between the rectifier output nodes $V_{R1}$ and $V_{R2}$. Therefore, the voltage across the switch S is defined by the difference in the secondary windings turns ratios. This permits a lower voltage rated switch S to be used. Moreover, the particular type of switch used can be selected as necessary, or desired, within the inventive concept, and does not itself form part of the invention. In fact, the switch S could be an electro-mechanical switch, or an electronic switch.

If the switch S is in the closed state, then the second rectifier circuit 28 is reverse biased by the higher voltage of the first rectifier circuit 26. If the switch S is in the open state, then the first rectifier circuit 26 is non-conductive since there is not a complete circuit. Therefore, only one of the rectifier circuits 26 and 28 is conducting at any given time. This results in improved efficiency, particularly at low output voltages.

The configuration of the switch S and rectifier circuits 26 and 28 results in input electromagnetic interference being reduced since conduction is virtually continuous. Specifically, the secondary windings 22 and 24 are alternately coupled to the load 12, as discussed above, so that the current through these windings is equal as defined by the load current. The current through the primary winding 20 is modulated by the difference in transformer ratio between the first and second windings 22 and 24. In fact, the primary winding current changes according to the transformer ratio $T_1/T_2$, where $T_1$ is the transformer ratio between the primary winding 20 and the first, or high voltage, secondary winding 22, and $T_2$ is the transformer ratio between the primary winding 20 and the second, or low voltage, secondary winding 24. This provides an advantage as compared with single winding switched trimming TRU's where the input current varies between zero and a controlled amplitude.

The switch S is controlled by a pulse-width modulated (PWM) control circuit 32. The PWM control circuit 32 senses the actual voltage across the load 14 and operates the switch S at a frequency independent of the frequency of the AC power so that the output voltage is maintained at a regulated value. Preferably, the switch S is controlled at a frequency substantially in excess of the AC power source frequency so that regulation can be accurately maintained.

The PWM control circuit 32 includes a conventional compensation circuit 34 coupled to the high voltage input terminal 12-1. The compensation circuit 34 modifies the sensed DC output signal to stabilize the control loop and transfers the modified output signal to an integrator circuit 36. A voltage reference signal $V_{REF}$ is also coupled to the integrator circuit 36. The $V_{REF}$ signal can be generated by any known means, and represents the desired, regulated DC level at the output 12. The integrator circuit 36 is operable to integrate the difference between the desired voltage level defined by the $V_{REF}$ signal and the actual voltage level from the compensation circuit 34. An output of the integrator circuit 36 is coupled to one input of a comparator 38. A second input of the comparator 38 is coupled to a sawtooth wave generating circuit 40. The comparator 38 develops a pulse-width modulated signal on a line 42 which is coupled to a switch control circuit 44. The switch control circuit is operable, in the illustrated embodiment, to operate the switch S in the closed state if it receives a logic high input, and to otherwise operate the switch S in the open state.

The comparator 38 compares the integrated error signal to the saw-tooth signal to develop a pulse signal having a frequency determined by the frequency of the saw tooth signal. The width of the pulses is determined by the level of the integrated error signal. The integrated error signal voltage varies over a range similar to that of the saw-tooth signal. During each cycle of the saw-tooth, a pulse is produced during the portion of the cycle when the saw-tooth signal is at a voltage level greater than the voltage level of the integrated error signal. Specifically, the switch S is operated from zero percent cycle time if the integrate error signal is at maximum voltage, to one hundred percent cycle time if the integrated error signal is at minimum voltage. Resultantly, the rate of change of the duty cycle of the switch S is determined by the level of the error.

Figure 2:
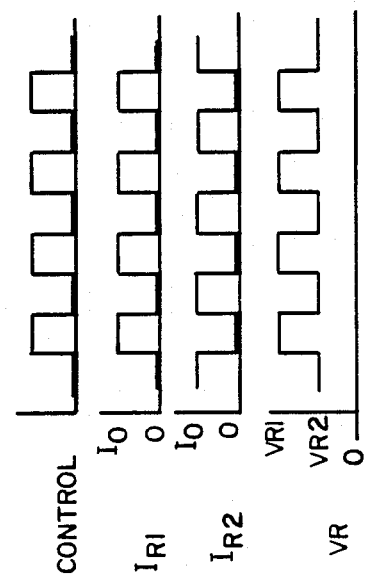
FIG. 2 is a series of waveforms illustrating the operation of the TRU of FIG. 1.

Referring to FIG. 2, a series of waveforms illustrate the operation of the TRU 10. The first waveform, labeled "control" indicates the operation of the switch control circuit 44. Specifically, when the control signal is at a relative high level, then the switch S is in the closed state, and when the control signal is at a relative low level, then the switch S is in the open state. If the switch S is in the closed state, as indicated by the pulse, then a current $I_{R1}$ flows from the first rectifier 26, and a current $I_{R2}$ from the second rectifier circuit 28 is zero.

Conversely, when the switch is in the open state, then the first rectifier circuit current $I_{R1}$ is zero and current flows through the second rectifier circuit 28. In either case, current flow is indicated by the value $I_0$ representing the current level provided to the load 14. The voltage at the rectifier connection node $V_R$ also is in the form of a pulse signal, varying between the voltage levels at nodes $V_{R1}$ and $V_{R2}$, as discussed above. Specifically, the voltage at node $V_R$ alternates between high voltage from node $V_{R1}$ and the low voltage from node $V_{R2}$ so that the average voltage at the output 12 is in between these two levels, particularly by an amount determined by the pulse-width modulating circuit 32. In fact, the greater the pulse-width, the greater the average voltage level.

Although the TRU illustrated in FIG. 1 utilizes a switch S having a normally open contact, the switch S could be provided with a normally closed contact with the PWM control circuit 32 being modified accordingly, as is obvious to those skilled in the art.

Similarly, the TRU 10 could be provided with the transformer 18 having a primary winding 20 and/or secondary windings 22 and 24 in a $\Delta$ configuration, as is obvious to those skilled in the art.

The TRU 10 of FIG. 1 is operable to selectively provide regulated DC power from two unregulated DC sources, the regulated sources comprising each of the secondary windings and its associated rectifier circuit.

With the TRU 10 each unregulated DC source utilizes a single type winding, i.e. Y-configuration or $\Delta$-configuration. This results in a DC output signal which includes low frequency harmonics. Referring to FIG. 3, transformer rectifier unit (TRU) 50 according to an alternative embodiment of the invention utilizes $\Delta$-Y sets for the secondaries. The $\Delta$-Y sets provide reduced harmonic content on both the input and output lines, thereby reducing input EMI significantly.

The TRU 50 includes a transformer 52 having a three phase primary winding 54 coupled to a source 56 of AC input power. The transformer 52 includes two Y-$\Delta$ connected pairs of three phase secondary windings. Specifically, one pair includes a first a secondary winding 58 and a first Y secondary winding 60, and the other set includes a second $\Delta$ secondary winding 62 and a second Y secondary winding 64. The turns ratios of the first $\Delta$ secondary winding and the second $\Delta$ secondary winding 62 are determined so that AC voltage developed in the first $\Delta$ secondary winding 58 is higher than that developed by the second $\Delta$ secondary winding 62, as above relative to the transformer 18 of FIG. 1. A similar voltage relationship is provided between the first and second Y secondary windings 60 and 64, respectively.

The first and second $\Delta$ secondary windings 58 and 62 are coupled to respective first and second three-phase full-wave bridge rectifier circuits 66 and 68. A switch $S_1$ having a normally open contact connects the high voltage sides of the rectifier circuits 66 and 68. The low voltage sides of the rectifier circuits 66 and 68 are connected to a current sense resistor $R_1$ which is in turn connected to a reference node 70. The high voltage side of the second rectifier circuit 68 is also connected to a $\Delta$ voltage node $V_1$.

The switch $S_1$ operates to induce a DC voltage at the node $V_1$ which comprises the voltage developed at the first rectifier circuit 66 if the switch $S_1$ is in a closed state, or the voltage developed at the second rectifier circuit 68 if the switch S1 is in the open state, similarly to that discussed above relative to FIG. 1.

The first and second Y secondary circuits 60 and 64 are coupled to respective third and fourth three-phase full-wave bridge rectifier circuits 72 and 74. A switch $S_2$ having a normally open contact connects the high voltage sides of the rectifier circuits 72 and 74. The low voltage sides of the rectifier circuits 72 and 74 are both connected to a second current sense resistor $R_2$ which is in turn connected to the reference node 70. The high voltage side of the second rectifier 68 is also connected to a Y voltage node $V_2$.

The switch $S_2$ operates to induce a DC voltage at the node $V_2$ which comprises either the voltage developed at the third rectifier circuit 72 if the switch $S_2$ is in the closed state, or the voltage developed at the fourth rectifier circuit 74 if the switch $S_2$ is in the open state, similarly to that discussed above relative to FIG. 1.

Coupled between the nodes $V_1$ and $V_2$ is an interphase transformer 76. The interphase transformer 76 is operable to combine the AC output from one of the first or second rectifier circuits 66 and 68 and one of the third or fourth rectifier circuits 72 and 74 to produce a DC output at a node $V_3$ having a reduced harmonic content, and thus less distortion, as is well-known.

A filter inductor 78 and a capacitor $C_{10}$ are series-connected between the node $V_3$ and the reference node 70. The inductor 78 and capacitor $C_{10}$ act as a low-pass filter to eliminate the AC component of the output power, resulting from the switching frequency of the switches $S_1$ and $S_2$. The regulated DC output power is provided between the reference node 70 and a junction 72 between the capacitor $C_{10}$ and the inductor 78, which may be connected to a load 74.

The junction 72 is coupled to a compensation circuit 76 which is in turn connected to an error signal integrator circuit 78. The compensation circuit 76 and integrator circuit 78 are similar to the corresponding circuits 34 and 36 discussed above relative to FIG. 1. The integrator circuit 78 is also connected to a conventional reference signal generating means $V_{REF}$. Accordingly, the integrator circuit 78 develops an output signal comprising an integrated error signal, the error representing the difference between a desired regulated output and the actual output.

With Y-$\Delta$ connected pairs of secondary windings, it may be necessary, or desirable, to provide proper balancing. Specifically, due to differences in the transformer windings, there may not be proper load sharing between the secondary windings of each set. Improper balancing would tend to reduce the effect of a Y-$\Delta$ set.

The integrator circuit 78 is connected to first and second PWM control circuits 80 and 82, respectively. The first PWM control circuit 80 includes an integrator circuit 84, a saw-tooth generator circuit 86 and a comparator 88. Similarly, the second PWM control circuit 82 includes an integrator circuit 90, a saw-tooth generator circuit 92 and a comparator 94. Specifically, the error signal integrator circuit 78 is connected to the first and second PWM integrator circuits 84 and 90 through respective resistors R3 and R4. Balance control is provided by resistors $R_5$ and $R_6$ which connect the integrator circuits 84 and 90 to the respective first and second current sense resistors $R_1$ and $R_2$.

The first PWM control circuit comparator 88 is coupled to a first switch control circuit 96 for operating the first switch $S_1$. Similarly, the second PWM control circuit comparator 94 is connected to a second switch control circuit 98 for operating the second switch S₂. The PWM control circuits 80 and 82, and the associated respective switch control circuits 96 and 98, operate similarly to the PWM circuit 32 and switch driver circuit 44 discussed above relative to FIG. 1 and are operable to alternately open and close the respective switch contacts S₁ and S₂ responsive to pulse-width modulated signals developed by the comparator circuits 88 and 94.

Referring to FIG. 4, a series of waveforms illustrate the relationship between the voltages present at any given time at nodes $V_1$, $V_2$ and $V_3$. The voltage signal at node $V_1$ is a pulse wave varying between the low relative DC level developed at the second rectifier circuit 68 and the high relative DC level developed at the first rectifier circuit 66. The frequency of the pulse wave is determined by the frequency of the saw-tooth signal. The width of the pulses is determined primarily by the amount of time in each cycle during which the switch S₁ is closed. The waveform of the voltage at node $V_2$ is similar, and varies between the low relative DC voltage produced by the fourth rectifier circuit 74 and the high relative DC voltage level produced by the third rectifier circuit 72. The width of these pulses is determined primarily according to the amount of time in each cycle which the second switch S₂ is closed.

In the illustrated example, the width of the pulses of the Y waveform signal present at node $V_2$ are greater than that for the Δ waveform signal present at the node $V_1$. This results from the balance control discussed above provided between the two circuits. The resulting combined voltage signal at node $V_3$ is a pulse-type signal having step-wise leading and trailing edges according to the relative pulse widths determined according to the amount of error and the balancing provided, as is obvious to those skilled in the art.

Thus, the use of Y-Δ connected sets of secondary windings results in regulated DC output power having less distortion than with the TRU 10 of FIG. 1.

Also, according to the present invention, the transformer rectifier unit is provided which provides regulated DC power from a regulated AC power as by pulse-width modulating between two DC signals produced from the AC input.

We claim:

1. A transformer rectifier unit (TRU) for developing regulated DC output power at an output circuit, comprising:
   first interface means for connecting to a first source of unregulated DC power having a first DC output level;
   second interface means for connecting to a second source of unregulated DC power having a second DC output level less than the first DC output level;
   switching means coupled to said first and second interface means and said output circuit and operable to selectively couple either said first or said second source of DC power to said output circuit;
   means for sensing a parameter of said DC output power; and
   modulating means defining a preselected cycle time for operating said switching means to alternately couple said first and second sources of DC power to said output circuit during each cycle for relative time periods determined responsive to said sensing means.

2. The TRU of claim 1 wherein said second interface means is coupled directly to said output circuit and said switching means is coupled between said first interface means and said second interface means to minimize the voltage across said switching means.

3. The TRU of claim 1 wherein said switching means includes means for providing current flow through only one of said first and second interface means at one time.

4. The TRU of claim 3 wherein said switching means includes means for directing current flow from either said first or said second interface means according to which of said sources is coupled to said output circuit.

5. The TRU of claim 1 wherein said modulating means comprises means for generating a pulse signal, said pulse signal having a pulse width corresponding with the relative time periods determined responsive to said sensing means.

6. A transformer rectifier unit (TRU) for developing regulated DC output power from AC input power provided y an AC source defining an input power frequency, comprising:
   a transformer having a primary winding connectable to a source of AC input power and first and second secondary windings wherein the first secondary winding develops a first AC output level and the second secondary winding develops a second AC output level lower than the first AC output level;
   first and second rectifier circuits respectively coupled to the first and second secondary windings for rectifying the outputs therefrom;
   switching means coupled to said first and second rectifier circuits and operable in first and second states for providing regulated DC output power from one of said rectifier circuits to a load circuit;
   means for sensing a parameter of said DC output power; and
   means responsive to said sensing means for operating said switching means alternately between said first and second states at a preselected frequency independent of the input power frequency to provide regulated DC output power.

7. The TRU of claim 6 wherein said second rectifier circuit is coupled directly to said load circuit and said switching means is coupled between said first rectifier circuit and said second rectifier circuit to minimize the voltage across said switching means.

8. The TRU of claim 6 wherein said switching means includes means for providing current flow through only one of said first and second rectifier circuits at one time.

9. The TRU of claim 8 wherein said switching means includes means for directing current flow from either said first or said second rectifier circuit according to which of said sources is coupled to said load circuit.

10. The TRU of claim 6 wherein said operating means comprises means for generating a pulse signal, the pulse signal having a pulse width corresponding to the sensed parameter.

11. The TRU of claim 6 wherein said operating means operates said switching means at a substantially higher frequency than that of the AC input power.

12. A transformer rectifier unit (TRU) for developing regulated DC output power from AC input power provided by an AC source defining an input power frequency, comprising:
   a transformer having a primary winding connectable to a source of AC input power and first and second secondary windings wherein the first secondary winding develops AC power at a first level and the second secondary winding develops AC power at a second level lower than the first level;

first and second rectifier circuits respectively coupled to the first and second secondary windings for rectifying the AC power therefrom to DC power having corresponding first and second DC levels;

a switch coupled between an output of said first rectifier circuit and an output of said second rectifier circuit and operable in first and second switching states to provide DC output power from one of said rectifier circuits to a load;

sensing means for sensing the level of the DC power provided by said switch; and pulse-width modulating (PWM) means coupled to said switch and said sensing means for alternately operating said switch between said first and second states at a preselected frequency greater than the input power frequency and for relative time periods responsive to said sensed level to provide regulated DC output power.

13. The TRU of claim 12 wherein said pulse-width modulating means comprises means for generating a pulse signal, the pulse signal having a pulse width determined according to the relative time periods determined responsive to said sensing means.

14. The TRU of claim 12 wherein said pulse-width modulating means operates said switch at a substantially higher frequency than that of the AC input power.

15. The TRU of claim 12 further comprising a filter circuit coupled between said rectifier circuits and the load 16. A transformer rectifier unit (TRU) for developing regulated DC output power from AC input power provided by an AC source defining an input power frequency, comprising:

a transformer having a primary winding connectable to a source of AC input power, first and second- a secondary windings, and first and second Y secondary windings, wherein the first $\Delta$ and Y secondary windings each develops a first preselected AC output level, and the second Y and $\Delta$ secondary windings each develops a second AC output level lower than that of the corresponding respective first $\Delta$ and Y AC output levels;

first, second, third and fourth rectifier circuits respectively coupled to the first and second $\Delta$ secondary windings and the first and second Y secondary windings for rectifying the outputs therefrom;

first switching means coupled to said first and second rectifier circuits and operable in first and second states for providing a first regulated DC output from either said first rectifier circuit or said second rectifier circuit;

second switching means coupled to said third and fourth rectifier circuits and operable in first and second states for providing a second regulated DC output from either said third rectifier circuit or said fourth rectifier circuit;

means for coupling the first and second switching means to a load;

means for sensing a parameter of said DC output power provided to said load and means responsive to said sensing means for operating said first and second switching means alternately between said first and second states at a preselected frequency independent of the input power frequency to provide regulated DC output power.

17. The TRU of claim 16 further comprising balancing means coupled to said switching means for compensating the operation of said secondary windings to provide proper load sharing therebetween.

18. The TRU of claim 16 wherein said coupling means comprises an interphase transformer.

* * * * *